United States Patent [19]
Marks et al.

[11] Patent Number: 5,371,173
[45] Date of Patent: Dec. 6, 1994

[54] POLED POLYMERIC NONLINEAR OPTICAL MATERIALS

[75] Inventors: Tobin J. Marks, Evanston, Ill.; Michael A. Hubbard, Summitt, N.J.; Jiann T. Lin, Taipei,

[73] Assignee: Northwestern University, Evanston, Ill.

[21] Appl. No.: 981,342

[22] Filed: Nov. 25, 1992

[51] Int. Cl.$^5$ ............................................. C08G 73/10
[52] U.S. Cl. ..................... 528/322; 528/125; 528/128; 528/170; 528/171; 528/172; 528/173; 528/220; 528/228; 528/321; 526/262
[58] Field of Search ............... 528/322, 170, 171, 172, 528/173, 125, 128, 220, 228, 321; 526/262

[56] References Cited

U.S. PATENT DOCUMENTS

| | | |
|---|---|---|
| 3,301,847 | 1/1967 | Mangini et al. |
| 3,705,870 | 12/1972 | Darmory et al. |
| 3,950,127 | 4/1976 | Halasz et al. ............................ 8/10.1 |
| 4,283,522 | 8/1981 | Takahashi et al. ................... 528/170 |
| 4,346,206 | 8/1982 | Takahashi et al. ..................... 528/88 |
| 4,413,107 | 11/1983 | Locatelli ............................... 526/262 |
| 4,526,838 | 7/1985 | Fujioka et al. ........................ 428/458 |
| 4,680,377 | 7/1987 | Matsumura ........................... 528/322 |
| 4,782,185 | 11/1988 | Müller .................................. 564/406 |
| 4,917,455 | 4/1990 | Soane ................................. 350/96.34 |
| 4,927,907 | 5/1990 | Corley ................................. 528/322 |
| 4,999,139 | 5/1991 | Kurihara et al. ..................... 252/587 |
| 5,112,871 | 5/1992 | Mandal et al. ....................... 522/117 |

OTHER PUBLICATIONS

"Highly Thermally Stable Electro-Optic Response In Poled Guest-Host Polyimide Systems Cured at 360° C." by Wu, et al., *J. Appl. Phys.*, vol. 69, No. 10, May 15, 1991.

"Thermal Stability of Electro-Optic Response In Poled Polyimide Systems"; by Wu. et al, *Appl. Phys. Lett.* vol. 58, No. 3, Jan. 21, 1991.

"Thermoplasticity and Parallel-Plate Poling of Electro-Optic Polyimide Host Thin Films;" by Valley, et al., *Appl. Phys. Lett.*, vol. 60, No. 2, Jan. 13, 1992.

*Primary Examiner*—John Kight, III
*Assistant Examiner*—P. Hampton-Hightower
*Attorney, Agent, or Firm*—Welsh & Katz, Ltd.

[57] ABSTRACT

The synthesis of a nonlinear chromophoric co-monomer 3,5-diamino-4'-nitrodiphenylamine and use as a reactive component in combination with a bismaleimide monomer in a NLO-active polyimide matrix is disclosed. After concurrent corona or contact poling and thermal polymerization, thin films of these chromophoric polyimides exhibit high second harmonic generation efficiencies and high DSC-determined glass transition temperatures. These poled polyimides also exhibit excellent SHG temporal stability, retaining 85-90% of the initial second harmonic efficiency after more than one month in air at 85° C.

7 Claims, 4 Drawing Sheets

POLED POLYMERIC NONLINEAR OPTICAL MATERIALS

BACKGROUND OF THE INVENTION

This invention was made with Government support under Grant No. DMR 8821571 awarded by the National Science Foundation and Grant No. 90-0071 awarded by the Air Force Office of Sponsored Research. The Government has certain rights in the invention.

This invention relates to polymeric nonlinear optical materials, and more specifically thin film chromophore-functionalized poled polyimides.

Materials which exhibit highly nonlinear optical characteristics of doubling or tripling the frequency of incident light are currently of great scientific and technological interest for use in optical telecommunications, optical signal processing and, ultimately, the construction of optical computers. Nonlinear optics is concerned with the interactions of electromagnetic fields in various media to produce new fields which may be altered in phase, frequency or amplitude. Such media and their physical properties as well as their nonlinear optical properties have been of great interest in the field.

Formerly, inorganic materials, such as $KH_2PO_4$, $LiNbO_3$ or $InSb$, were used as NLO materials, and are currently being replaced by materials based upon conjugated $\pi$-electron organic chromophores, which promise superior performance and adaptability to the desired chemical functions. Organic nonlinear optical materials characteristically have large non-resonant susceptibilities, ultrafast response times, low di-electric constants; high-damage thresholds and intrinsic tailorability. The nonlinear optical response exhibited by organic materials with large delocalized $\pi$-electron systems is in many cases much better than that shown by prior inorganic materials.

When utilizing nonlinear chromophores within an organic matrix to attain second order nonlinearities (frequency doubling, second harmonic generation or, simply SHG), the chromophore molecules must be in a specifically aligned orientation within the organic matrix for the frequency doubling effects. Some current organic chromophore systems involve dissolving the chromophore guest molecules in a suitable polymer host, heating the mixture near or above the glass transition temperature of a polymer ($T_g$); the chromophore molecules are then orientated or "poled" by the use of an applied DC electric field and cooled until solidification sets in. These materials are sometimes referred to as solid organic guest-host substances. Several disadvantages with guest-host substances have been noted. For example, there may be limited solubility of the chromophore in the host polymer, resulting in crystallization of the chromophore out of the polymer matrix and subsequent poor frequency doubling performance; instability of the polymer-chromophore mixture has been observed resulting in the leaching or vaporizing of the chromophore molecules from the host polymer, causing deterioration in frequency doubling performance; there may be mobility of the chromophore molecule within the host polymer matrix, allowing relaxation of the chromophore orientation and resulting in loss of second harmonic generation.

Rational synthetic approaches to efficient polymeric second-order nonlinear optical materials must address the crucial requirements of maximizing constituent chromophore number densities while achieving and preserving maximum microstructural eccentricity. Acceptable thermal environments must ultimately include those of device fabrication as well as prolonged use. To these ends, poled cross-linkable chromophoric co-monomers represent significant advances over early guest-host (chromophore-doped) and non-cross-linked systems. Nevertheless, enhancing the limits of materials and SHG thermal/temporal stability remains an important goal. As polymeric materials, polyimides display great structural versatility as well as impressive thermal stability and optical transparency characteristics. Moreover, polyimides have recently been employed as hosts in poled, guest-host NLO materials.

SUMMARY OF THE INVENTION

Accordingly, an object of the subject invention is a stable, long-lasting, efficient, high performance nonlinear optical material.

Another object of the subject invention is the incorporation of a far higher amount of chromophore into a polymer matrix, causing higher frequency doubling performance.

Another object of the invention is the reduction of leaching and vaporization of chromophore materials from the polymer matrix, thereby providing a longer performance life.

A further object of the invention is the retardation of the relaxation of the preferential orientation of the chromophore molecule, thereby providing a longer performance life.

These and other objects are attained in the subject invention wherein a nonlinear chromophoric co-monomer such as 3,5 diamino -4'- nitrodiphenylamine is used as a reactive component with a bismaleimide or a bisimide monomer in a NLO-active polyimide matrix. After poling and thermal polymerization, thin films of the resulting chromophoric polyimides show high second harmonic generator efficiencies, high glass transition temperatures, with excellent SHG temporal stability.

DETAILED DESCRIPTION OF THE INVENTION

In the practice of the subject invention, a bisimide of the general formula

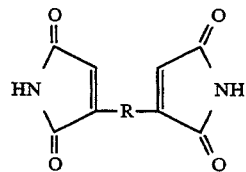

I where R=alkyl, aryl, heterocyclic (c=1-30) or combinations of such groups with a bridging non-carbon atom such as N, O, S or, a bismaleimide of the general formula

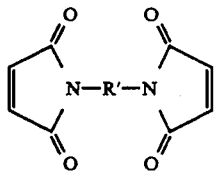

II where $R^1$=alkyl, aryl, heterocyclic (c=1-30) or combinations of such groups with a bridging non-carbon atom such as N, O, S, P. Such imides may be used in conjunction with a chromophoric molecule to form the polyimide matrix.

Specific examples are the following:

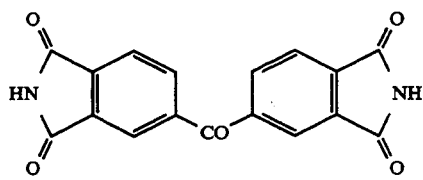

III

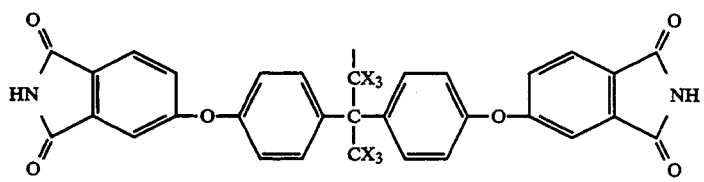

IV

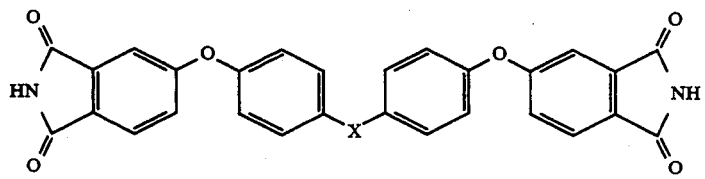

V

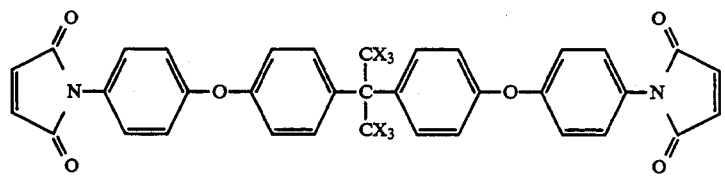

VI

Other imides and their derivatives as well as derivatives of the above may be used as known to those skilled in the art.

The chromophoric molecule utilized as a co-monomer with the bisimide or bismaleimide may be of the general formulas

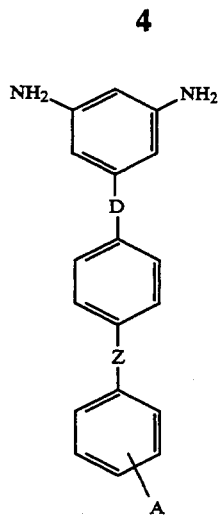

VII

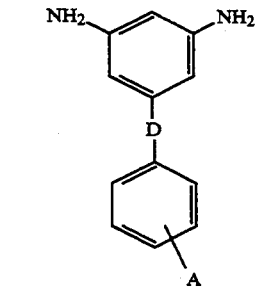

VIII

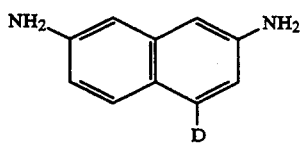

IX where A=one or more electron acceptor groups such as $NO_2$, CN, $CO_2R$, $SO_2R$, or

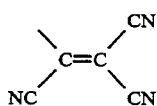

D=an electron donor group such as NH, O, S, PR
Z=one or more conjugated C=C or C≡C linkages.
R=H, alkyl or aryl group (C=1-30)

A specific chromophore useful in the subject invention is the following:

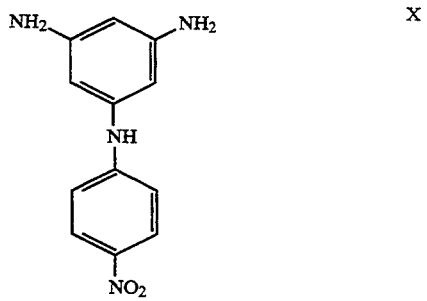

Figure 1:
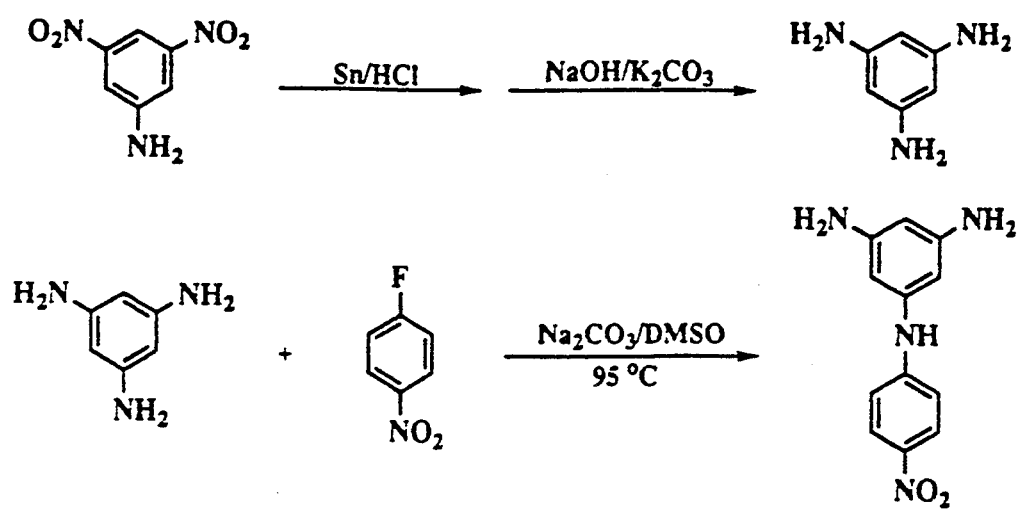
FIG. 1 shows the method of synthesis of a typical Diamino NLO chromophore for use in the subject invention.

Diamino NLO chromophore X (calculated $\beta_{vec}=27.6\times10^{-30}$ $cm^5esu^{-1}$ at hw=1.17 eV) was synthesized according to the sequence of FIG. 1 and was characterized by standard spectroscopic and analytical techniques.

More specifically, and with reference to the reaction sequence set forth in FIG. 1, the following procedures were followed:

EXAMPLE 1

3,5-Dinitroaniline

To a flask containing 3,5-dinitrobenzoyl azide (14.0 g, 59.0 mmol) was added 120 mL of toluene. After being refluxed for 3 h the solution was cooled to 60° C. and added 1.1 equivalent of potassium hydroxide (3.64 g) in 60 ml of water. The 3,5-dinitroaniline formed was filtered from the cooled solution and recrystallized from hot toluene/pentane; yield, 51.8% (5.60 g). $^1H$ NMR ($d^6$-DMSO): $\delta 7.86\tau, J=1.2$ Hz, 1H, CH); 7.77 (d,2 h, CH).

EXAMPLE 2

1,3,5-Benzenetriamine 3,5-Dinitroaniline (10.0 g, 54.6 mmol) and mossy tin (26.0 g, 218 mmol) were added slowly to 100 mL of conc. HCl at 65° C. with vigorously stirring. A reaction vessel with a volume of 1L or larger and equipped with a reflux condenser is used since the reaction is vigorous. The temp. was maintained for 1 h. After the solution was cooled to room temperature, sufficient amount of water was added to dissolve all white precipitates and unreacted tin was filtered. The filtrate was pumped dry and washed with THF (10 mL×5) to provide white powders (X). The mixture of the white powders (X) and sodium carbonate (5.7 g, 53.8 mmol) was dissolved in 150 mL of degassed water, and 11.0 g (275 mmol) of sodium hydroxide in 10 mL of water was added dropwise under $N_2$ atmospheric pressure. After 1 h the solution was pumped dry and the residue was Soxhlet extracted with $CH_2Cl_2$. Removal of $CH_2Cl_2$ provided white crystalline 1,3,5-benzenetriamine (2.0 g, 29.8%).

$^1H$ NMR ($d^6$-DMSO): $\delta 5.12$ (s, 3H, CH); 4.32 (s, 6H, $NH_2$); MS (EI, 70 ev): M+123.1.

Chromophore Synthesis

EXAMPLE 3

3,5-(Diamino)-4'-nitrodiphenylaniline

To a mixture of 1,3,5-benzenetriamine (1.96 g, 15.9 mmol) prepared as above, sodium carbonate (4.4 g, 41.5 mmol), and 1-fluoro-4-nitrobenzene (4.48 mL, 42.2 mmol) was added 25 mL of methyl sulfoxide and refluxed at 95° C. for 71 h. After filtration, the solution was pumped dry and the residue was dissolved in THF. The THF solution was soaked with silica (230–400 mesh) and pumped dry. It was then carefully loaded on the top of a column (50 cm in length and 3 cm in diameter) packed with silica (230–400 mesh) in $CHCl_3$. The column was eluted with $EtOH/CHCl_3$ (1:10 in vol.). Compound (X1) was obtained as orange crystals from the second major red band after removal of the solvent; yield, 16.0% (626 mg). $^1H$ NMR ($d^6$-DMSO): $\delta 8.87$ (s, 1H, NH); 8.22 (d, J=9.20 Hz, 2H, CH); 6.96 (d, 2H, CH); 5.69 (s, 2H, CH); 5.60 (s, 1H, CH); 4.83 (s, 4H, $NH_2$); MS (EI, 70 ev): M+244.1; Anal Calcd for $C_{12}H_{12}N_4O_2$; C, 59.01; H, 4.95; N, 22.94. Found: C, 58.26; H, 4.81; N, 22.59.

NLO Film Preparation

Figure 2:
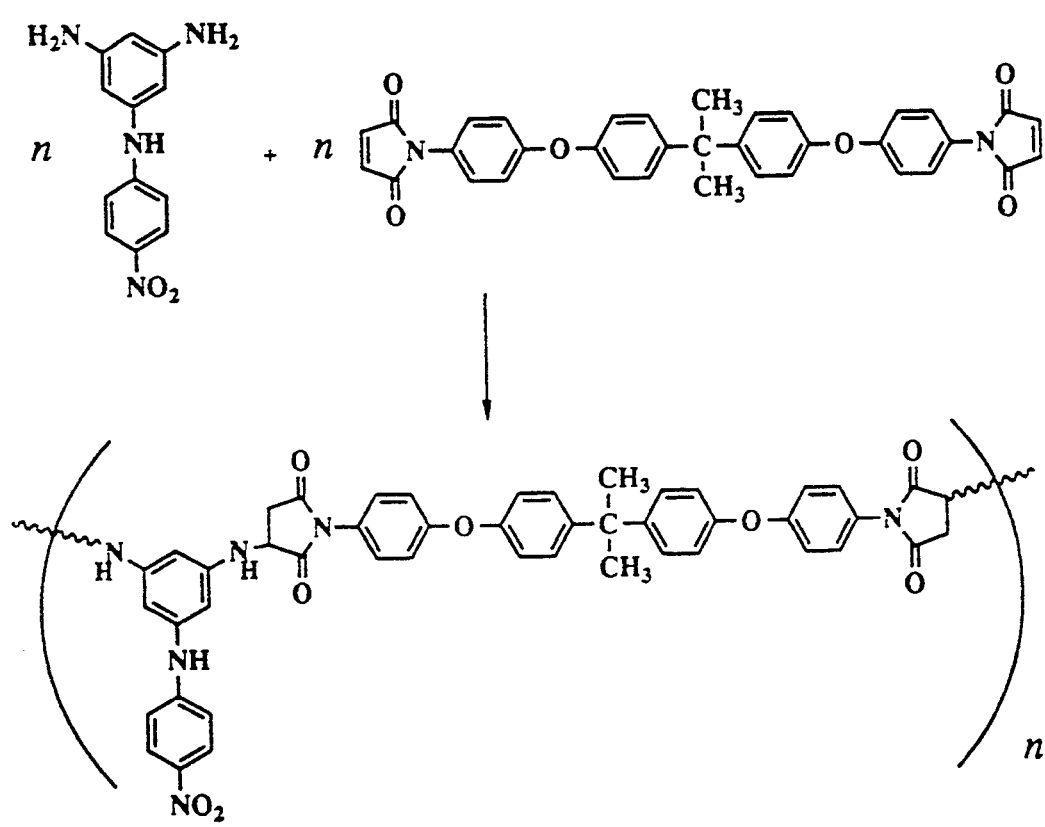
FIG. 2 shows the copolymerization of the chromophore of FIG. 1 and a typical imide monomer in the method of the subject invention.

Films were cast by slow evaporation in a laminar flow clean hood of dry, filtered (5 μm syringe filter) solutions in THF or other volatile non-polar solvents of equivalent molar amounts of the chromophore and bismaleimide co-monomer on an inorganic substrate, such as a clean soda lime glass, quartz, silicon or gallium arsenide. Alternatively, the substrate may be coated with a protective "buffer layer," e.g., a siloxane or any other polymeric material such as an unfunctionalized polyimide. Partial polymerization (precuring) of the cast films was then achieved by heating at various temperatures under vacuum. Conditions for polymerization and verification of the type of chemistry portrayed in FIG. 2 may be established in solution by $^1H$ NMR spectroscopy. Cured films are typically 4 μm in thickness as measured by profilometry. Corona poling or contact poling and final polymerization (curing) of the chromophore-polyimide films is carried out under $N_2$ at temperatures from 200° C. to 400° C. for 1.0 h in in situ SHG instrumentation. In corona poling, the corona needle-to-film distance is 1.0 cm and the applied potential is 5–20 kV and preferably 5–6 kV. Alternatively, contact poling can be used, i.e., an electrode is attached to the upper surface of the polymer film and the current turned on. Poled films are cooled to room temperature over a period of 0.5 h before removing the poling field, and the initial measurement of storage SHG properties made within 15 min of field removal. SHG measurements on the films (λ=1.064 μm) are made at room temperature in the polarized geometry and are referenced against quartz using standard procedures and instrumentation. Film specimens for time-dependent SHG decay studies are stored in air in a thermostatted tube furnace at 85° C. Films are removed from the furnace and allowed to cool to ambient temperature before SHG measurements were performed. Transmission optical spectroscopic measurements indicate only minor changes in film optical properties through the poling/curing process, arguing for minimal if any thermal decomposition.

EXAMPLE 4

A mixture of N,N-4,4'-[(1-methyl ethylene)bis-9phenyleneoxy phenylene)]bismaleimide and (3,5-diamino)-4'-nitrodiphenylamine in 1:1 stoichiometric ratio was dissolved in dry, distilled THF (the concentration was about 0.018M). The solution was then filtered through a 5 μm syringe filter and cast onto the surface of soda lime glass (12 mm thick). The solvent was evaporated slowly in a Class 100 laminar flow hood. The films were then stored in dynamic vacuo overnight and precured at specified conditions. $\lambda_{max}$ (before curing)=432 nm; $\lambda_{max}$ (after curing)=440 nm.

Corona poling of the film was next carried out at specified temperature for 1 h using a needle-to-film distance of 1.0 cm and an applied corona potential of +5 to 6 kV. The film was then cooled to room temperature over a period of 1 h before removing the poling field, and the initial measurement of SHG properties made within 15 min. of field removal. SHG measurements on the film at 1.064 μm were taken at room temperature in the p-polarized geometry and were referenced against quartz using procedures and instrumentation described previously. $\lambda_{max}$ (after poling) =450 nm. The temporal stability of the film was measured at 25° C. or 80° C.

Figure 3:
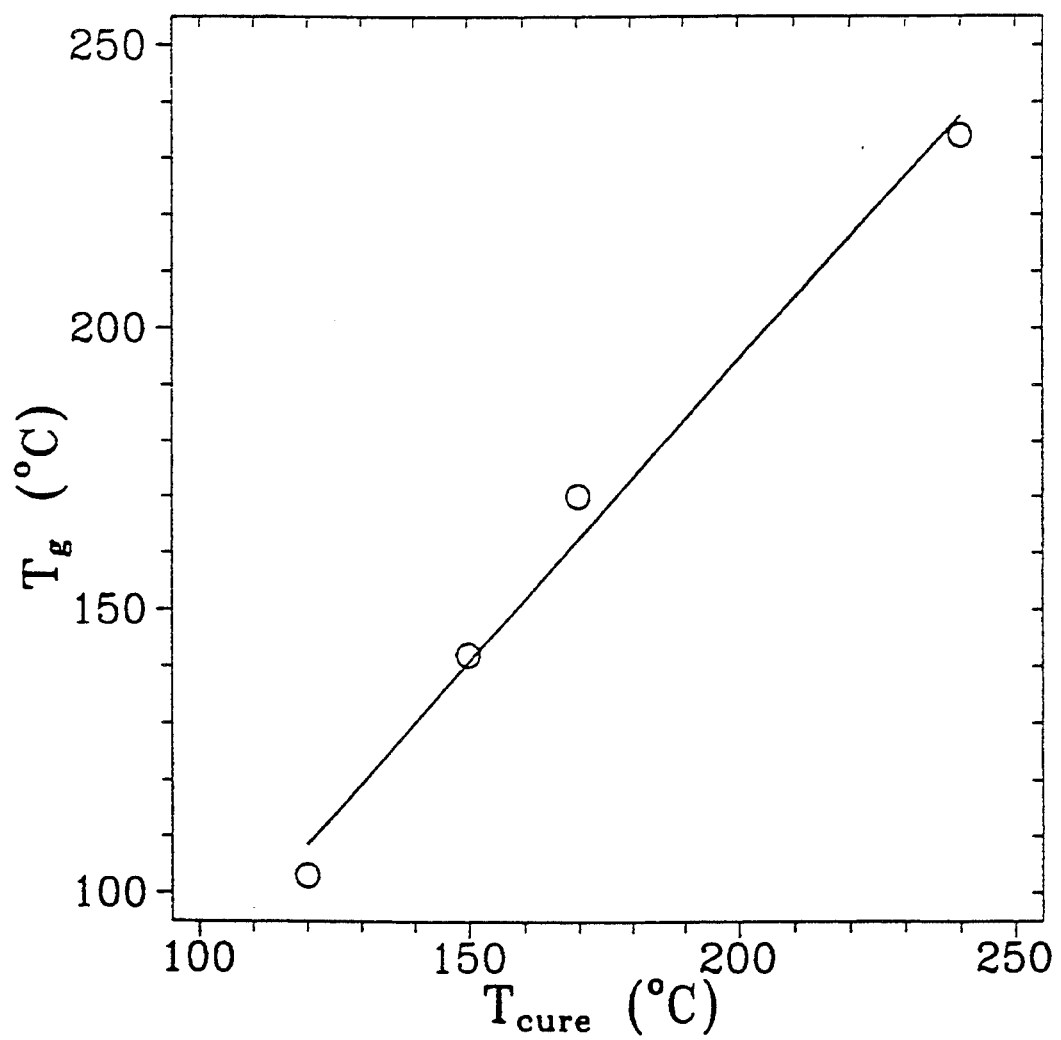
FIG. 3 is a graph showing DSC-determined glass transition temperature as a function of polymerization temperature for the polyimide of FIG. 2.

In FIG. 3 is shown the relationship between the chromophore-polyimide curing temperature and the DSC-determined $T_g$ value (236° C). The approximate linearity of this relationship is further indication that the polymerization process is well-behaved. Second harmonic indices, $d_{33}$, for the poled chromophore-polyimide were found to be in the range $11-13 \times 10^{-9}$ esu. These values are reasonable for a nitroaniline chromophore of the present architecture and estimated matrix chromophore number density ($-7 \times 10^{20}$ cm$^{-3}$). They are comparable in magnitude to $d_{33}$ values of similar chromophore-functionalized NLO polymers.

Figure 4:
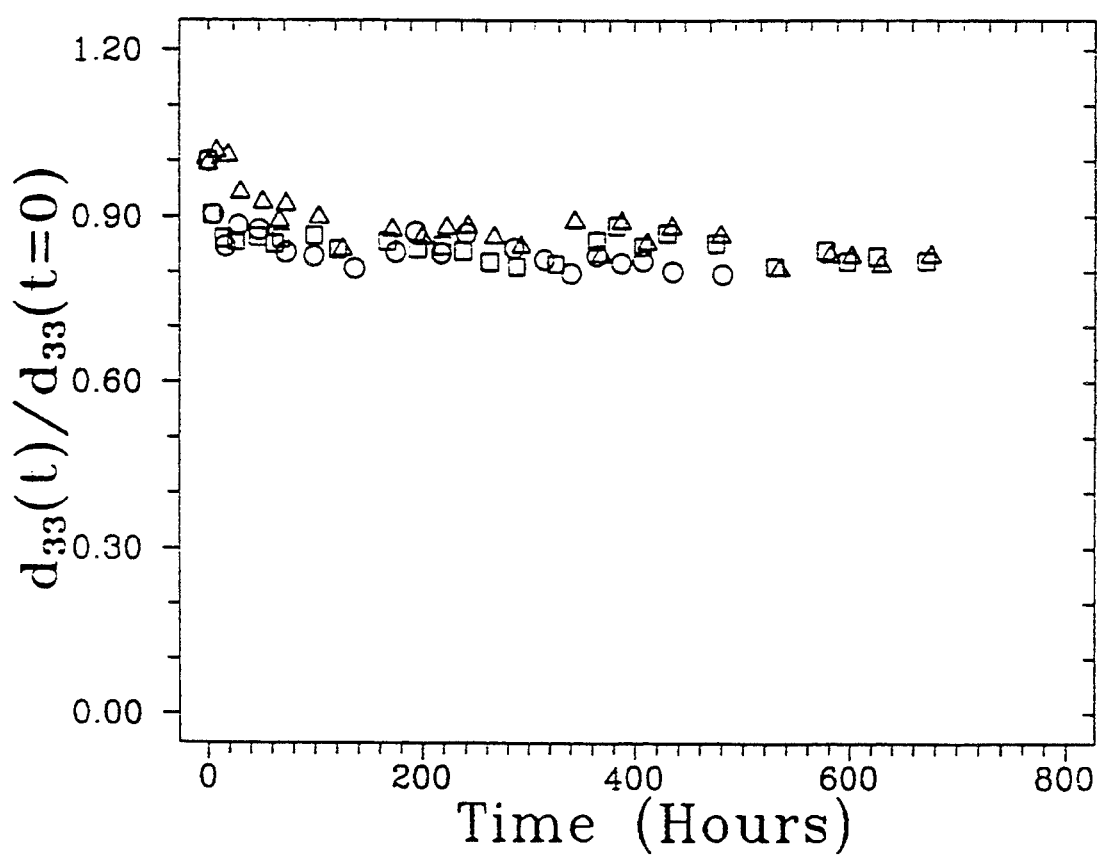
FIG. 4 is a graph showing SHG temporal characteristics at 85° C. for three films prepared from the polyimide of FIG. 2.

SHG temporal stability data at 85° C. for three chromophore-polyimide films precured and poled under differing thermal conditions are shown in FIG. 4. It was found that increases in the prepoling temperature ($T_{precure}$) are accompanied by increases in the achievable poling temperature ($T_{cure}$), above which SHG signal loss and film damage are apparent. Importantly, FIG. 4 reveals only minor (about 10–15%) decay in SHG efficiency over the first 24 h at 85° C., and within the precision of the measurements, negligible to very minor decay over the following month at 85° C. Also noteworthy is the small sensitivity of the $d_{33}(t)$ characteristics to the nature of the precure/cure protocol. Attempts to fit the $d_{33}(t)$ data by nonlinear least-squares to either a biexpoential or Kohlrausch-Williams-Watts stretched exponential expression were inconclusive ($\tau$ values diverged) owing to the small observed $d_{33}$ temporal dependence.

These results demonstrate that NLO chromophore-functionalized polyimide structures can be prepared which, after appropriate thermal polymerization and electric field poling, exhibit very high $T_g$ values, efficient SHG characteristics and unprecedented SHG temporal stability.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments and equivalents falling within the scope of the appended claims.

Various features of the invention are set forth in the following claims.

What is claimed:

1. A chromophore functionalized poled polyimide comprising the poled polymerization product of a diamino chromophore selected from the group consisting of:

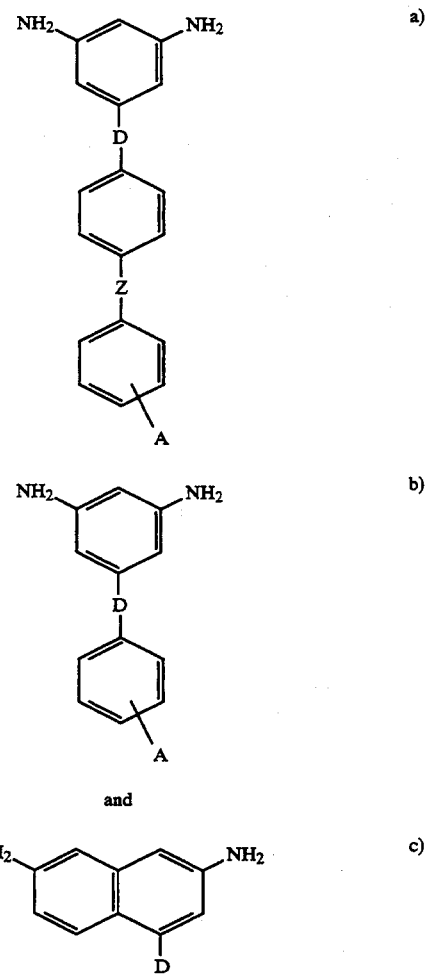

where A is one or more electron acceptor groups selected from the group consisting of $NO_2$, CN, $CO_2R$, $SO_2R$, and

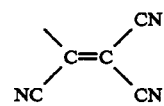

D is an electron donor group;
Z is one or more C=C or C≡C;
R is H, alkyl or aryl (C is 1–10);
and a bisimide monomer.

2. A chromophore-functionalized poled polyimide comprising the polar polymerization product of a diamino chromophore selected from the group consisting of:
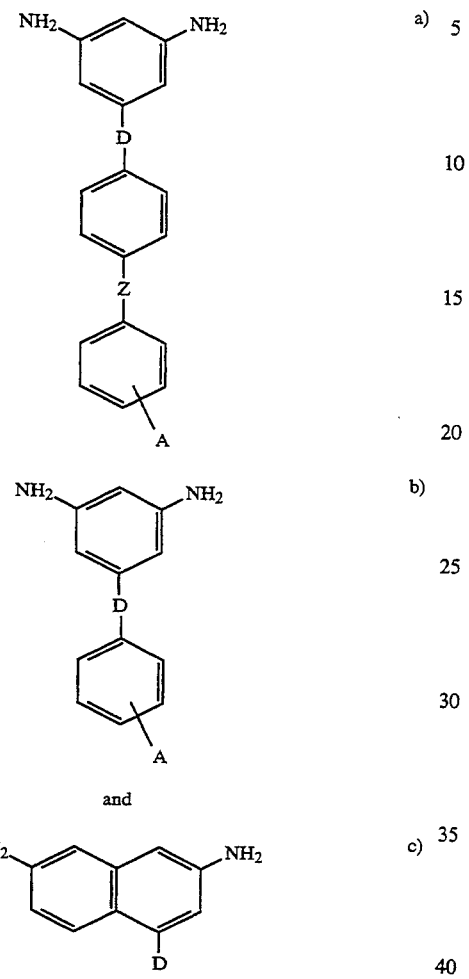
and an imide selected from the group consisting of
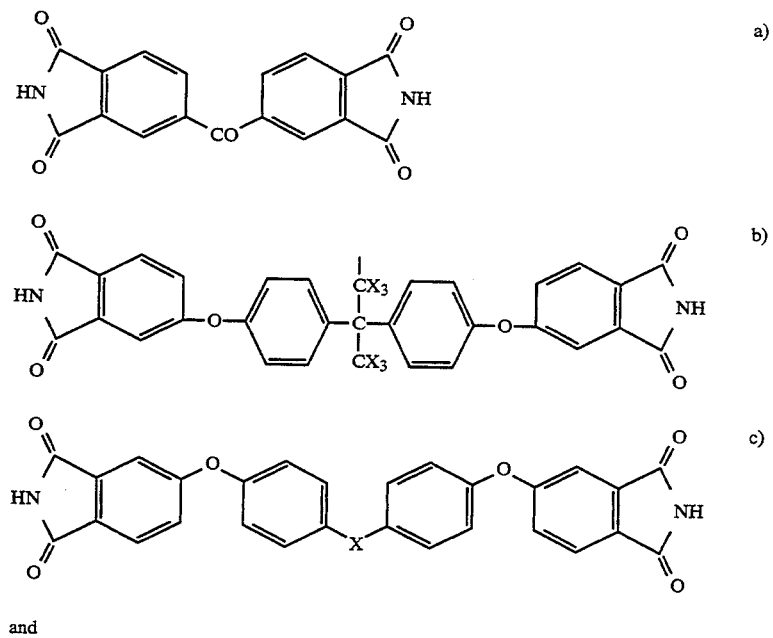
and

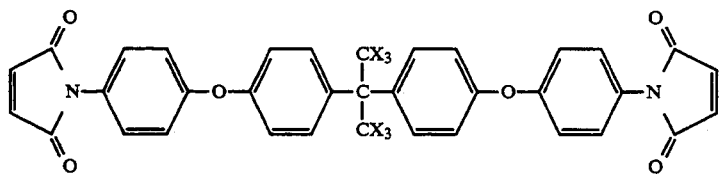

where A is one or more electron acceptance groups selected from the group consisting of $NO_2$, CN, $SO_2R_1$, $CO_2R$,

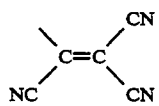

D is an electron donor group
Z is one or more of conjugated C=C or C≡C linkage.
x is halide or H.
R is H, alkyl, aryl (C is 1-30).

3. A chromophore functionalized poled polyimide comprising the poled polymerization product of a diamino chromophore and a bisimide monomer selected from the group consisting of

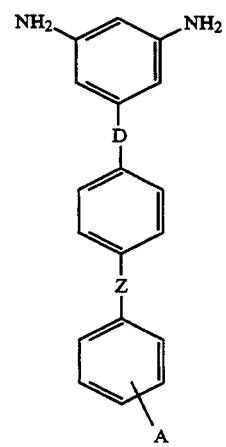

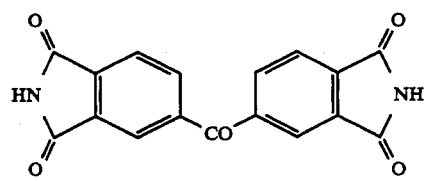

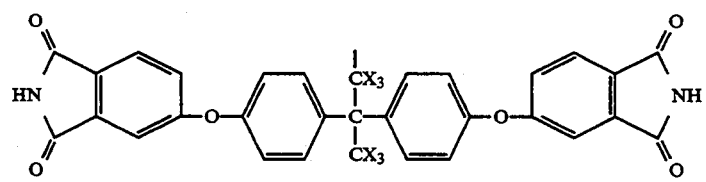

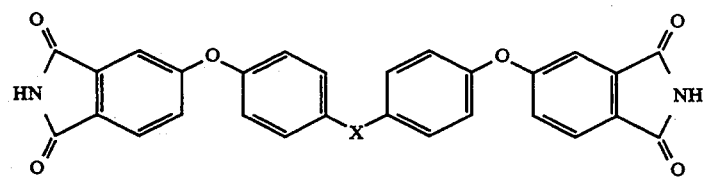

and

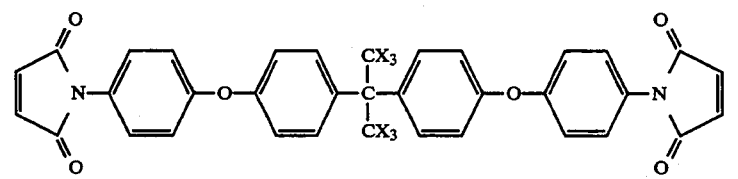

where x is halide or H.

4. The chromophore functionalized poled polyimide of claim 3 wherein the chromophore is selected from the group consisting of:

-continued

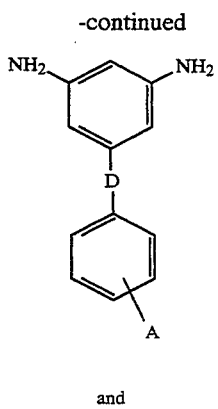
b)

and

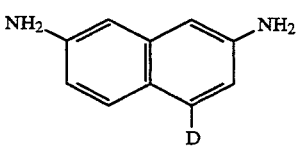
c)

where A is one or more electron acceptor groups selected from the group consisting of NO₂, CN, CO₂R, SO₂R, and

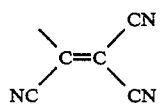

D is an electron donor group,
Z is one or more C=C or C≡C,
R is H, alkyl or aryl (C is 1–10).

5. The chromophore functionalized poled polyimide of claim 3 wherein the diamino chromophore is (3,5 diamino)-4'-nitrodiphenylamine.

6. The chromophore functionalized poled polyimide of claim 1, wherein the bisimide monomer is a bismaleimide.

7. A non-linear optical chromophore functionalized poled polyimide of claim 1 wherein the chromophore is selected from the group consisting of:

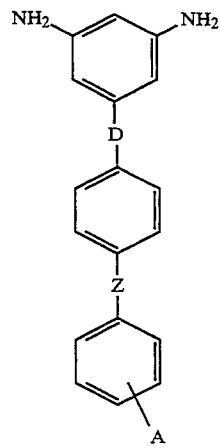
a)

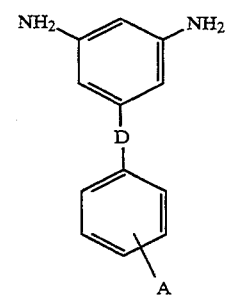
b)

and

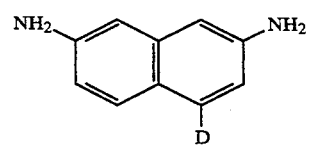
c)

where A is one or more electron acceptor groups selected from the group consisting of NO₂, CN, CO²R, SO₂R, and

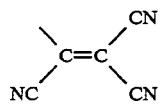

D is an electron donor group;
Z is one or more C=C or C≡C;
R is H, Alkyl or aryl (C is 1–10).

* * * * *